Dec. 17, 1968 P. BRUNO 3,416,560
FLUID LEAK MONITORING APPARATUS
Filed Aug. 23, 1965 3 Sheets-Sheet 1

INVENTOR.
Peter Bruno
BY
ATTORNEY.

INVENTOR.
Peter Bruno
ATTORNEY.

United States Patent Office 3,416,560
Patented Dec. 17, 1968

3,416,560
FLUID LEAK MONITORING APPARATUS
Peter Bruno, 2933 Colgate Ave.,
Delanco, N.J. 08075
Filed Aug. 23, 1965, Ser. No. 481,525
13 Claims. (Cl. 137—455)

ABSTRACT OF THE DISCLOSURE

A leak sensing device for a fluid transmitting system is connected in the system as near to the supply as possible and comprises a housing having a pair of coaxial, stepped, communicating chambers of relatively small and large diameters. The smaller one serves as a fluid inlet chamber from the supply and the larger one as an outlet chamber to the system. A piston loosely mounted within the larger chamber for axial movement therealong has its front surface facing downstream and entirely exposed. The rear surface of the piston, which can seat against the step of the chambers, has connected thereto a rod which extends through the smaller chamber to a microswitch in an arming circuit which controls a shut-off valve coupled to the fluid input pipe of the system. This piston rod is of such diameter as to substantially reduce the open area of the piston rear surface below that of its front surface. Thus, when the system is filled with the fluid, since the fluid pressure per unit area is constant throughout the system, the total force on the piston's larger, front surface is then greater than that on its rear, smaller surface. The resulting upstream force differential holds the piston against the aforesaid step and maintains the microswitch open. Should a leak develop downstream of the sensing device, the force on the piston front surface drops below that on its rear surface. The resulting downstream force differential thereupon forces the piston away from said seat to cause the piston rod to follow and close the microswitch. This energizes the aforesaid circuit to cause the system shut-off valve to close and shut off the fluid supply.

---

Figure 1:
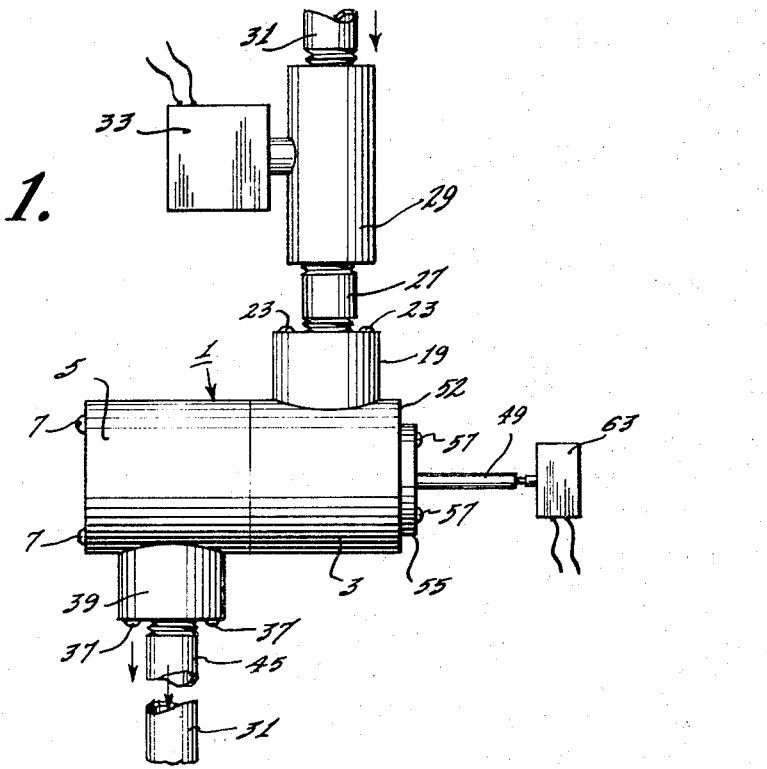

This invention relates to apparatus for monitoring fluid transfer systems to sense leaks that may develop therein and to automatically shut off the fluid supply thereto upon sensing a leak therein, and particularly to apparatus for sensing or detecting a leak in a piped water or other liquid distribution system, as in a home, and automatically shutting off the liquid supply upon detection of a leak.

It is not uncommon for leaks to develop in piped systems which serve to transfer fluids from one location to another under pressure, or which distribute to various outlets fluids supplied under pressure from a given source. For example, after a period of time, a water line system in a home or other building may develop one or more leaks due to corrosion of the pipes. In some systems, as where acids or other liquids which attack metals are to be transmitted between two points, it is necessary to use non-metallic pipes or hoses which may be made of rubber, plastic or other flexible materials. Pipes made of such materials have been known to rupture and thus develop a leak. Again, in pipe lines for transmitting natural gas or the like, or such liquids as oil, gasoline, etc., and wherein various lengths of pipe units are coupled together, it sometimes happens that couplings become loose or worn to a degree to form a leak. In all such and other similar cases, much damage and loss can result not only by reason of waste of the fluid, itself, but also by reason of damage caused to other items attacked by the leaked fluid. Thus, for example, in a home which may be unattended for an extended period, if a water leak should occur, the leaked water can cause much damage to rugs and furniture if left to accumulate. It is obvious, therefore, that a device which can monitor a fluid transfer system, sense any serious leak that may develop, and automatically shut off the supply of fluid to the system in response to such sensing is highly desirable.

Various types of monitoring or sensing mechanisms have been proposed heretofore. In general, these mechanisms have been quite complicated, fairly expensive in many cases, more or less difficult to adapt to and install in existing fluid transfer systems, especially in water lines in homes, and often not too reliable.

The primary object of this invention is to provide an improved monitoring apparatus useful in systems for transmitting or distributing various fluids, whether liquids or gases, to readily sense or detect leaks in such systems and automatically shut off the supply of the fluid thereto before serious damage can result, which apparatus will be free from the aforementioned and other disadvantages characteristic of apparatus heretofore proposed for the same purpose.

More particularly, it is an object of this invention to provide improved monitoring apparatus as aforesaid which, while by no means limited thereto, is especially adapted for use in a piped water distributing system in a home, office building, hospital, warehouse and the like to sense leaks therein and automatically shut off the supply of water from the mains before any appreciable damage will be inflicted by the leaked water.

Another object of this invention is to provide improved leak sensing apparatus as above set forth which will provide a ready indication that the fluid supply has been shut off in response to a detected leak.

Still another object of this invention is to provide an improved leak sensing apparatus of the type set forth which can be either armed or set at will to be operative to detect a leak and provide the aforesaid indication or not, as desired.

A further object of this invention is to provide, in leak sensing apparatus of the type set forth, an improved sensing device which has only one moving part.

Still a further object of this invention is to provide improved leak sensing apparatus which can be made to respond to leaks above a given rate or magnitude, so that it is useful even in cases where a very slight or a very slow leak can be tolerated.

Yet another object of this invention is to provide improved fluid leak monitoring apparatus which can be connected readily in fluid transmitting lines of various sorts.

It is also an object of this invention to provide improved fluid leak monitoring apparatus which is simple in construction, has a minimum number of necessary parts, is easy to manufacture, is inexpensive in cost, and which is highly efficient in use.

In accordance with this invention, the monitoring apparatus comprises a sensing device adapted to be connected in a fluid transmitting pipe line, such as the water line in a home, for example, preferably as close to the main water supply as possible. This sensing device is in the nature of a valve mechanism having a housing structure formed with a chamber having a pair of adjacent, communicating, stepped chamber portions which may be axially aligned. Since they are stepped, the two chamber portions have different diameters. The smaller one of these portions is a fluid intake chamber to which is connected a fluid input coupling having a shut-off valve connected thereto. The other, or larger, chamber portion is a fluid outlet chamber to which a fluid output coupling is connected. The two chambers are closed off from the exterior of the housing by walls at the extreme, opposite ends thereof, the stepped portion of the chambers providing an additional wall or seat in the output chamber at the plane of demarcation of the two chambers for a purpose shortly to be set forth.

Loosely mounted within the outlet chamber for facile, longitudinal, axial movement therealong is a piston-like valve. To the rear surface of this piston is connected a rod of such diameter that it reduces the open area of this rear surface (that is, the area thereof exposed to the transmitted fluid) markedly below that of the front surface of the piston, which is entirely exposed. The rod extends from the piston rearwardly through the intake chamber and through the end closure wall thereof to the exterior of the housing where it cooperates with a normally closed microswitch in circuit with an electrical power source and with an arming or setting circuit for the sensing device. This arming circuit also includes a solenoid which controls the aforementioned shut-off valve, and it may also include, in one embodiment, a relay which controls energization of this solenoid, as well as suitable lights or other indicating means for indicating the condition of the system, as hereinafter more fully set forth.

Assuming that the fluid transmitting line in which the sensing device is installed is closed downstream of the device and that the line has no leaks, when the shut-off valve at the input coupling is opened, the line will become filled with the fluid under pressure supplied by the fluid source, such as a pump at a pumping station, for example. As the fluid passes from the smaller intake chamber into and through the larger outlet chamber, it forces the piston away from the intake chamber toward the closed end of the outlet chamber until both chambers and the line therebeyond become filled. Since the piston is loose in the outlet chamber, the fluid can seep around the piston to and beyond the forward end thereof, thus also acting as a fluid bearing for the piston to ease its movement along the outlet chamber and to reduce wear. Once the system is filled, the fluid assumes a static condition. In this condition, the pressure of the fluid per unit area is the same in the entire, closed system. However, since the area at the forward end face of the piston is substantially larger than that at the rear end face thereof, the total force acting against its forward face will be greater than that acting against the exposed portion of the rear face thereof, once the system is filled. The force differential, acting in a rearward or upstream direction, will then force the piston rearwardly until it engages the aforementioned seat in the outlet chamber where it is then held stationary. In response to the rearwardly moving piston, its rod is also moved rearwardly through the intake chamber and the rear closure wall thereof until the rod engages the microswitch and opens it; and so long as the piston and rod remain in this position, the microswitch will remain open.

Normally (i.e., when monitoring of the system is not desired), the aforementioned arming circuit is turned off. Let it be assumed, now, that it is desired to render the device operative to sense a leak downstream of the sensing device. To do so, the aforementioned arming circuit is turned on. Now, if a leak develops downstream of the sensing device, a drop in fluid pressure takes place within the outlet chamber and therefore the total force acting on the forward face of the piston diminishes, while that on the rear face of the piston remains substantially constant. When the force acting against the forward end of the piston has diminished to a point below that continuing to act on the rear face thereof, the force differential then acting upon the piston in a forward direction will cause the piston to move forwardly away from its seat and thereby retract its rod from the microswitch to permit the microswitch to close. Since the arming circuit is turned on, closing of the microswitch will energize the solenoid (through the relay if one is used) to cause the solenoid to close the shut-off valve at the inlet to the system. At the same time, the signal indicating means will be turned on automatically to show that the fluid supply to the system has been turned off. After the leak has been repaired, the arming circuit can be turned off. This causes the relay and the solenoid windings to be de-energized and the shut-off valve at the inlet to be opened again so as to admit fluid once more and thus cause the operative parts of the sensing device to be restored to their normal, stand-by condition.

Figure 4:
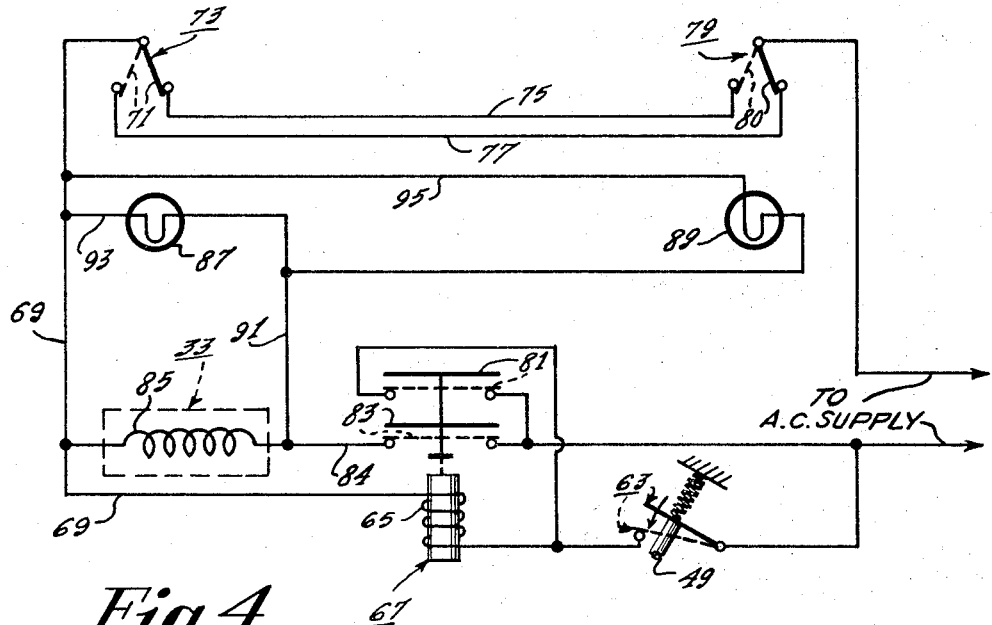
Figure 2:
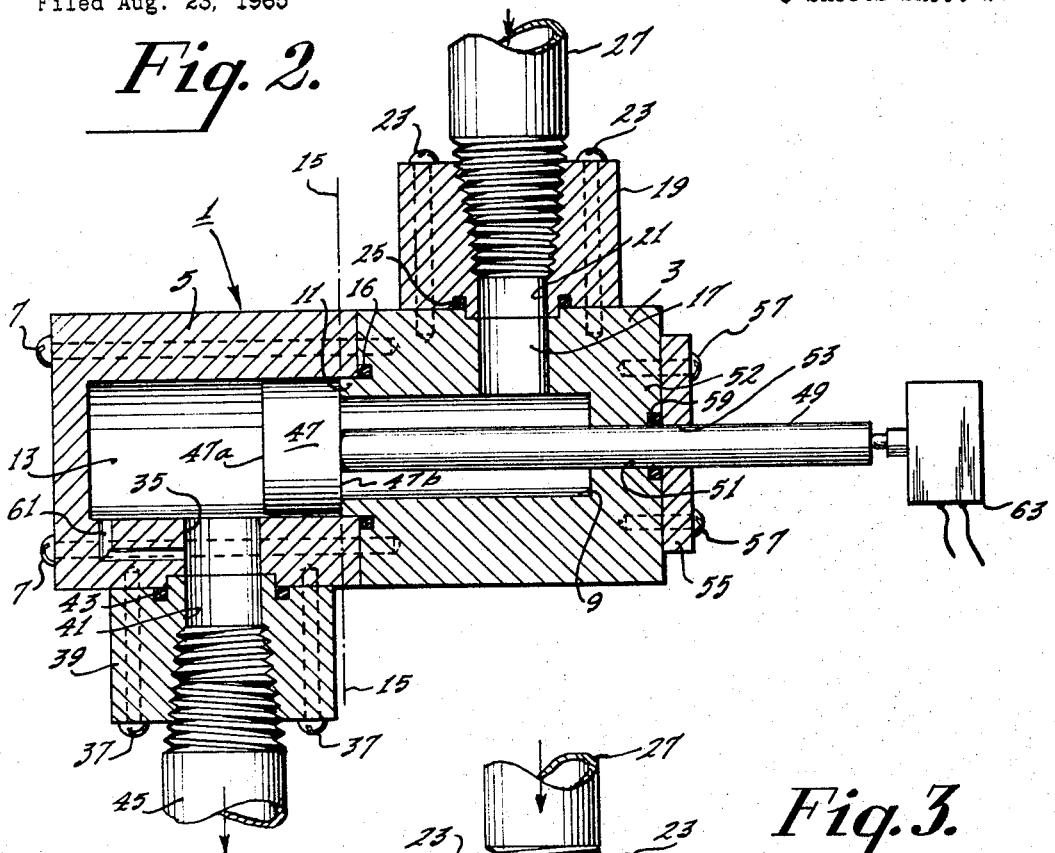
Figure 3:
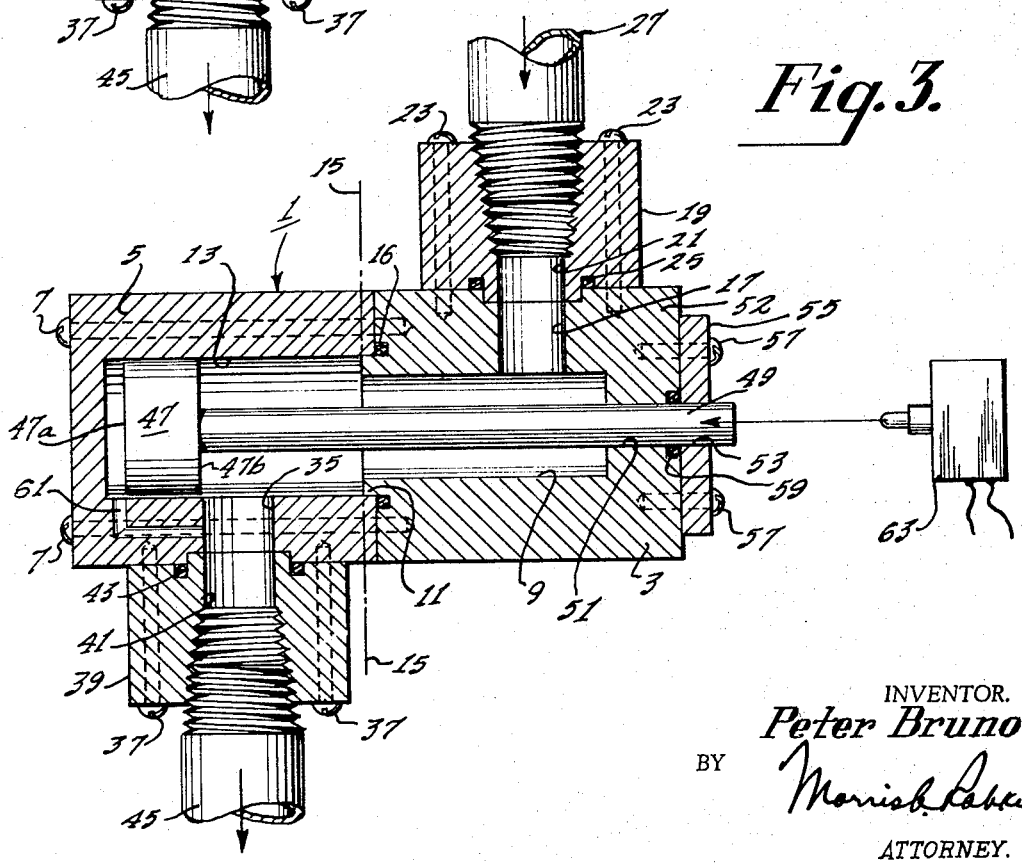
Figure 5:
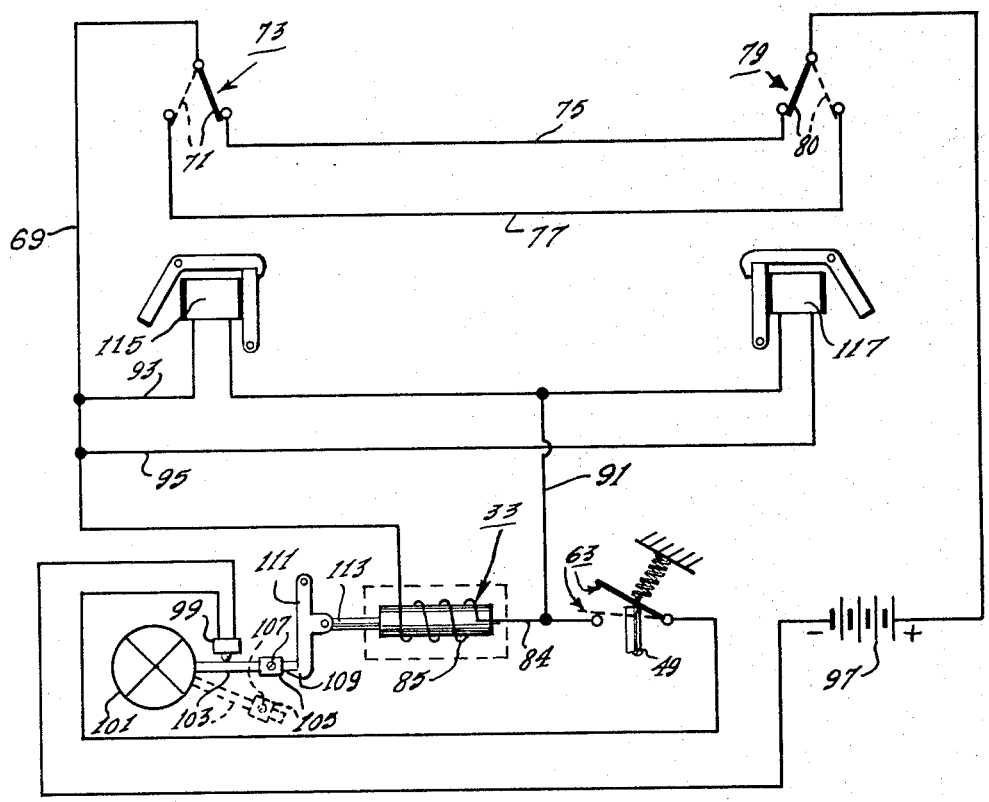

The novel features of this invention, both as to its organization and method of operation, as well as additional objects and advantages thereof, will be understood more readily from the following description, when read in connection with the accompanying drawings in which:

FIG. 1 is a front elevation of one form of sensing device according to the present invention, FIG. 2 is an enlarged, central sectional view thereof showing the position occupied by the piston and its rod when the fluid system is filled and the fluid is in static condition, FIG. 3 is a view similar to FIG. 2 but showing the piston and rod in the position occupied by them after having been moved forwardly as a result of a leak, FIG. 4 is a circuit diagram forming part of the monitoring apparatus according to one embodiment of this invention, this circuit being useful particularly with an alternating current source if energy, and FIG. 5 is a similar circuit diagram of a circuit embodiment which is especially useful with a source of direct current energy.

Referring more particularly to the drawings, there is shown, in FIGS. 1–3, a sensing device 1 comprising a safety valve mechanism having a housing made of two housing parts 3 and 5 held together by a plurality of screws 7. The housing part 3 is formed with an intake chamber 9 and it has, at one end, an extension 11 which fits snugly into an outlet chamber 13 formed in the housing part 5. The extension 11 thus provides a step within the chamber 13 constituting a seat for a purpose presently to be set forth more fully. By reason of this step, the chamber 13 is of larger diameter than is the chamber 9. The chambers 9 and 13 are preferably coaxial, and the extension or step 11 terminates along a plane 15 perpendicular to the axis of the chambers. The plane 15 may be considered as the plane of demarcation between the two chambers, the chamber 9 being to one side of this plane and the chamber 13 to the other side thereof. An O ring 16 around the extension 11 provides a fluid-tight seal between the housing parts 3 and 5.

The housing part 3 is also formed with an inlet port 17 which communicates with the chamber 9. A coupling member 19 having an internally threaded bore 21 in communication with the port 17 is secured to the housing part 3 by screws 23. An O-ring 25 provides a fluid-tight seal between the coupling member 19 and the housing part 3. Threaded into the coupling member 19 is an input coupling 27 to which is connected a normally open solenoid operated shut-off valve 29 of any suitable, known form. The valve 29 is preferably connected into a pipe line 31 of a fluid transmitting system as far upstream therein as possible. The pipe line 31 may be a water line in a dwelling, for example, supplied under substantially constant pressure from a pumping station or other source (not shown), the line 31 being subject to possible leaks. The valve 29 is operated to and from open and closed positions by a solenoid 33 for controlling admission of the water or other fluid to the intake chamber 9.

The housing part 5 is also formed with a port 35 which communicates with the outlet chamber 13. Secured to the housing part 5, as by screws 37, is a coupling member 39 having an internally threaded bore 41 in communication with the port 35, an O-ring 43 providing a fluid-tight seal between the coupling member 39 and the housing part 5. An output coupling 45 is threaded into the coupling member 39, the output coupling 45 being connectable into the line 31 at a point downstream from the point of connection of the input coupling 27 to the line 31.

Mounted within the larger diameter outlet chamber 13 for movement therealong is a piston 47 which has a downstream facing, forward end 47a and an upstream facing, rear end 47b. The outside diameter of each end face 47a and 47b is the same, and there is a slight clearance between the piston 47 and the wall of the chamber 13 to permit facile movement of the piston along the chamber 13, as well as to permit seepage of the water or other fluid therearound. The fluid in the space between the piston and the chamber wall also serves to provide a fluid bearing for the piston as it moves along the chamber 13, thus further facilitating movement of the piston and reducing wear of both the piston and the chamber wall.

To the rear end 47b of the piston is connected a piston rod 49 of such diameter as to markedly reduce below the area of the forward end 47a the open area of the rear end 47b (i.e., the area of the latter left free or exposed for engagement by the fluid in the chamber 9). The piston rod 49 extends from the piston 47 rearwardly through the chamber 9, through an opening 51 in the end wall 52 of the housing part 3 which closes off the chamber 9, and through an opening 53 in an end plate 55 which is secured to the housing part 3 by screws 57. An O-ring 59 around the piston rod 49, held in place within a recess in the housing part 3 by the plate 55, provides a fluid-tight seal between the piston rod and the housing part 3 as the piston rod moves back and forth through the housing in the manner about to be explained. The piston rod 49 is of such length that its free end always extends more or less exteriorly of the housing and the end plate 55.

Let it be assumed, now, that the fluid transmitting system including the pipe line 31 and the sensing device 1 is closed and that there are no leaks in the system. With the shutoff valve 29 open, the system will fill up with the fluid admitted therethrough under pressure from the fluid supply. As the system fills up, the fluid admitted to the chambers 9 and 13, upon engaging the piston rear end 47b, will force the piston forwardly in a downstream direction toward the position thereof shown in FIG. 3. When the piston 47 has advanced far enough to unblock the port 35, most of the advancing fluid will then flow from the chamber 13 directly into the port 35 and through the coupling member 39 and the output coupling 45 downstream into the portions of the line 31 beyond the sensing device 1. However, some of the fluid will also seep around and thus by-pass the piston 47 through the clearance between it and the wall of the chamber 13. The by-passing portion of the fluid will flow through a by-pass relief port or passage 61 in the housing part 5 which couples the downstream end of the chamber 9 to the port 35 and the output coupling 45 and thus further by-passes the piston 47.

When the system has become filled, the fluid assumes a static or no flow condition. In this condition, the fluid pressure throughout the entire system is substantially constant, and the pressure of the fluid per unit area against both the front end 47a and the rear end 47b of the piston 47 is the same. However, since the surface area of the forward end 47a of the piston is appreciably greater than the exposed surface area of the rear end 47b thereof, the total force exerted by the fluid against the front end 47a is greater than that exerted by the fluid against the rear end 47b. Thus, there is established on the piston a force differential in an upstream direction which pushes the piston 47 backwardly, or upstream, until the rear piston end 47b engages the step 11 and becomes seated thereagainst, as shown in FIG. 2. The by-pass passage 61 enables the piston to move upstream easily.

As the piston 47 moves backwardly, it moves the piston rod 49 backwardly out through the openings 51 and 53. By the time the piston 47 has come to a stop against the step seat 11, the free, outer or rear end of the piston rod will have engaged a normally closed microswitch 63 located externally to the housing part 3 in the path of movement of the rod 49 and will have opened this switch. Thereafter, as long as the piston 47 remains seated against the step 11, the rod 49 will hold the switch 63 open.

Now, if the line 31 should become open downstream of the sensing device 1, as when a leak develops therein, or if a faucet is opened, for example, the fluid pressure against the forward end 47a of the piston will drop while that against rear end 47b thereof will remain constant. Hence, the total force applied by the fluid against the forward end 47a will diminish gradually until a point is reached where it will be less than that applied by the fluid against the rear end 47b. Accordingly, there is then established a force differential which acts on the piston 47 in a downstream or forward direction to move the piston forwardly away from the seat 11 to the position shown in FIG. 3. As the piston 47 moves forwardly, it carries with it the rod 49 and thus retracts it from engagement with the switch 63 to permit the switch 63 to close.

The switch 63 is included in an arming or setting circuit forming part of the monitoring apparatus of the present invention. One embodiment of such circuit useful with an alternating current operable solenoid 33 is shown in FIG. 4. Here, energy is supplied from a suitable A.C. source through the switch 63 to the winding 65 of a lock-up or self-latching relay 67, one terminal of the switch 63 being connected to one side of the A.C. supply and the other to one end of the winding 65. The other end of the winding 65 is connected by a conductor 69 to the swinger 71 of a two-way arming switch 73 which may be connected to one end of one or the other of a pair of parallel conductors 75 and 77. A second two-way arming switch 79, which may be located remotely from the switch 73, has a swinger 80 which may also be connected to one or the other of the conductors 75 and 77, the swinger 80 being connected to the other side of the A.C. supply.

The relay 67 includes a pair of parallel switches 81 and 83 each having one terminal connected to the same side of the A.C. supply as is the switch 63. The switch 81 is connected in shunt relation with the switch 63. The other terminal of the switch 83 is connected by a conductor 84 to one end of the winding 85 of the solenoid 33, and the other end of the winding 85 is connected in series with the arming switch 73 by a conductor 69. A pair of indicator lamps 87 and 89 are provided, one preferably adjacent to the arming switch 73 and the other adjacent to the arming switch 79, for indicating when a leak that may have developed in the fluid transmitting pipe line 31 downstream from the sensing device 1 has been detected and the shut-off valve 29 closed. The lamps 87 and 89 are connected in parallel relation between the conductors 84 and 69 by conductors 91, 93 and 95.

The described circuit is normally disarmed by leaving the switch 73 connected to one of the parallel conductors 75 and 77 (say, the conductor 75) and the switch 79 connected to the other conductor, as shown by the solid line positions of their respective swingers 71 and 80 in FIG. 4. It does not then matter whether the normally closed microswitch 63 is closed or open, since the circuit to the A.C. supply is open. Now, let it be assumed that the fluid transmitting system comprising the pipe line 31 and the sensing device 1 is filled with fluid, the fluid has come to a static condition, and the piston 47 has been seated against the step 11 as above described. The piston rod 49 will then be in engagement with the microswitch 63 to hold it open. The monitoring apparatus can then be armed by connecting both of the arming switches 73 and 79 to the same one of either of the two conductors 75 and 77, as by moving either the swinger 71 or the swinger 80 to its dotted line position while leaving the other one in its solid line position. If, while the monitoring apparatus is thus armed, a leak develops downstream of the sensing device 1, the piston 47 will soon be moved to its forwardmost position of FIG. 3 and the piston rod 49 will be withdrawn from the microswitch 63 to permit it to close. Hence, the circuit to the relay 67 will become closed and the relay will be energized to close its switches 81 and 83.

Closing of the switch 81, which by-passes the switch 63, will insure continued energization of the relay 67 even if the switch 63 should happen to be opened again unintentionally due, for example, to some floating back and forth of the piston 47 and its rod 49, as may happen sometimes. Upon closure of the switch 83, the solenoid winding 85 is energized and the solenoid 33 immediately operates to close the shut-off valve 29 and thus shut off the further supply of fluid to the sensing device. Thus, the amount of fluid which can possibly leak out becomes limited and serious damage to surroundings is avoided. Furthermore, when the switch 83 closes, the circuit to the lamps 87 and 89 is completed and each lamp lights up to indicate that a leak has been sensed and the fluid supply has been shut off.

After the leak has been corrected, the circuit is disarmed by disconnecting either one of the swingers 71 and 80 from the common conductor 75 or 77 to which they are connected. This causes the relay winding 65 to become de-energized and the switches 81 and 83 thereof to open. Upon opening of the switch 83, the solenoid winding 85 is de-energized and the solenoid 33 opens the shut-off valve 29 to permit fluid to enter the system again. When the system has become filled again and the fluid therein has assumed a static condition, the piston is once again forced up against the seat 11 and the piston rod 49 again opens the microswitch 63. The circuit may then be armed again to await detection of a future leak.

When an alternating current supply is not available, or where it may be desirable to use a direct current source of energy, a circuit and shut-off valve such as shown in FIG. 5 may be employed. Here, energy is supplied from a battery 97 to the normally closed microswitch 63 through a second and normally open microswitch 99 in series therewith. The shut-off valve 101 in this case may be mechanical, rotary, plug valve having a valve operating arm 103 extending therefrom. An example of such a valve is shown in the Hinkson patent 1,173,966. The arm 103 has a slidable weight 105 thereon which can be adjusted to, and locked in, any desired position on the arm 103, as by a set screw 107. The weight 105 tends to hold the arm 103 in the lowered, dotted line position to thereby normally maintain the valve 101 closed. However, the arm 103 can be raised to the solid line position to open the valve 101 for admission of fluid to the system, and it can be latched in this position by the latching toe 109 of a pivotally mounted latch bar 111. When the arm 103 is in this raised, latched position, it engages the normally open microswitch 99 to close it.

The solenoid 33 has, within its winding 85, a core 113 which is pivotally connected to the latch bar 111. The switch 63 is connected directly to the winding 85 by the conductor 84 instead of through a relay switch, as in FIG. 4. Also, in the circuit of FIG. 5, instead of using the lamps 87 and 89 of FIG. 4 as the indicator devices, use is made of a pair of drop annunciators 115 and 117 connected in parallel relation between the conductors 84 and 69. Otherwise, the two circuits are generally similar, and the circuit of FIG. 5 can be armed in the same way as that of FIG. 4 described above.

Let it be assumed, now, that the arm 103 is latched by the toe 109, the system has been filled with the fluid, and the piston 47 is seated against the step 11 so that the piston rod is holding the switch 63 open. If a leak develops downstream of the sensing device, as soon as the leak is sensed, the piston rod 59 is retracted from the switch 63 and the latter closes. Since the switch 99 is also closed at this time, current will flow from the battery 97, through the switches 99 and 63, through the conductors 84 and 91, through the annunciators 115 and 117 to cause their indicating elements to drop and thus indicate that a leak has been sensed, and through the conductor 69 and the serially connected switches 73 and 79 back to the battery. At the same time, current will also flow through the switches 99 and 63 to the winding 85 to cause the solenoid core 113 to be pulled in and thus withdraw the latching toe 109 from the arm 103. The arm 103 will thereupon drop in response to the pull of gravity on the weight 105 to thereby close the valve 101 and shut off the supply of fluid to the system. As the arm 103 drops away from the switch 99, it permits the latter to open, thereby opening the battery circuit. Hence, even though the switch 63 is now closed and the switches 73 and 79 remain connected to a common conductor 75 or 77, no current will be drawn from the battery pending disarming of the circuit and relatching of the arm 103. In this way, battery life is greatly conserved. Opening of the battery circuit by opening of the switch 99 will not affect the dropped annunciator elements which will have to be reset manually after the circuit has been restored to standby condition in readiness to detect a future leak.

From the foregoing description, it will be apparent that there has been provided improved monitoring apparatus for detecting or sensing leaks in fluid transmitting systems, whether the fluid be a liquid or a gas, and for automatically shutting off the supply of the fluid to the system upon detection of a leak. The apparatus is quite simple in form and easy to manufacture and install. The sensing device proper has but one moving part therein, viz, the piston 47 and its rod 49. Such factors as the relative diameters of the piston 47 and the rod 49, the mass thereof, and the clearance between the piston and the wall of the chamber 13 determine the force differential necessary to move the piston in one direction or the other within the chamber 13. These parts can be so designed that the main fluid supply will be shut off only if a leak occurs at a rate above a predetermined rate (say one-half ounce per minute or more in a domestic water transmitting system). Thus, the water supply in a dwelling or a factory, for example, will not be shut off automatically in response to a very slowly leaking faucet. Again, in some industrial processes, for instance, a very slight leak may be tolerated in preference to a shut down of the line. By suitable, judicious design, the sensing valve structure can be made to respond to whatever rate of leak is deemed critical.

The housing of the sensing device may be made of brass, aluminum, or any other suitable non-ferrous metal if it is to be used in lines or systems designed to transmit water or any other inert fluid. Where, however, it is to be used in systems for transmitting fluids that attack metal, it may be made of any suitable plastic or other material, such as nylon, Plexiglas, hard rubber, etc. not subject to attack by the fluid. The sensing device can, of course, be made in different sizes to suit various applications and, in any case, the apparatus of this invention will be found to be highly efficient in use and to have a long life.

Although only one form of sensing device and two forms of arming circuits have been described herein for use with this sensing device, it will undoubtedly be apparent to those skilled in the art that other forms of both, as well as changes in the ones described, all coming within the spirit of this invention, are possible. Hence, it is desired that the foregoing shall be considered merely as illustrative and not in a limiting sense.

What is claimed is:

1. In apparatus for monitoring a fluid transmission system through which a fluid is transmitted under substantially constant pressure and which may be subject to leakage, the combination comprising (1) a safety valve mechanism including housing means having a chamber therein formed with a step along a transverse plane therethrough to provide a pair of adjacent, communicating chamber portions,
   (a) the chamber portion to one side of said plane comprising an intake chamber and being of relatively smaller diameter,
   (b) the chamber portion on the other side of said plane comprising an outlet chamber and being of relatively larger diameter by reason of said step, and
   (c) said step providing a seat in said outlet chamber,
(2) a fluid input coupling connected to said intake chamber and adapted to be connected to said system at a point relatively upstream thereof in respect of the direction of flow of said fluid through said system,
(3) a fluid supply control valve connected to said fluid input coupling and having open and closed positions whereby to control admission of said fluid from said system to said intake chamber,
(4) a fluid output coupling connected to said outlet chamber and adapted to be connected to said system at a second point downstream from said first mentioned point,
(5) a piston mounted in said outlet chamber for movement axially therealong, said piston having a forward end facing downstream and a rear end facing upstream said piston ends being of the same outside diameter,
(6) a piston rod connected to said piston rear end and extending rearwardly therefrom through said intake chamber and through said housing means to the exterior thereof, said rod being of such diameter as to appreciably reduce the exposed area of said piston rear end below that of said piston forward end whereby,
   (a) when said system is closed and devoid of leaks and said valve mechanism is filled with said fluid, the total force applied by said fluid against said piston forward end exceeds the total force applied by said fluid against said piston rear end exposed area to thereby normally apply a force differential on said piston in the upstream direction and thus move said piston rearwardly to bring its said rear end into engagement with said step seat, and
   (b) when said system develops a leak downstream of said valve mechanism, the total force then applied by said fluid against said piston forward end drops to below that applied by said fluid against said piston rear end whereby a force differential is then applied on said piston in a downstream direction to move said piston forwardly away from said seat, and
(7) an electric circuit for controlling the position of said fluid supply control valve, said circuit including an electric switch through which said circuit can be energized from a source of electrical energy, said switch being positioned to be actuated by said piston rod according to the position of said piston relative to said seat.

2. Apparatus according to claim 1 wherein there is a slight clearance between said piston and said outlet chamber to permit seepage of said fluid around said piston.

3. Apparatus according to claim 1 wherein said housing includes a passage therein coupling said outlet chamber to said fluid output coupling and capable of by-passing said piston when said piston has assumed its most downstream position in response to said downstream force differential.

4. Apparatus according to claim 1 wherein said switch is a normally closed microswitch positioned externally of said housing, said switch being engaged and held open by said piston rod when said piston is in engagement with said seat, and said switch closing again when said piston rod is withdrawn therefrom upon movement of said piston forwardly away from said seat.

5. Apparatus according to claim 1 wherein said electric circuit also includes a relay responsive to said switch when it is closed and a solenoid controlled by said relay, said solenoid being associated with said fluid supply control valve to effect movement thereof from its said open position to its said closed position in correspondence with the position of said piston in said outlet chamber relative to said seat.

6. Apparatus according to claim 5 wherein said circuit also includes manually settable switch means operable at will to either
   (1) arm said monitoring apparatus to render it operative to cause said relay to effect energization of said solenoid and closing of said fluid control valve upon detection of a leak in said system, or
   (2) disarm said monitoring apparatus to render it unresponsive to a detected leak.

7. Apparatus according to claim 6 wherein said circuit also includes means for indicating that a leak has been detected and said fluid control valve has been closed once said circuit has been armed by said manually settable switch means.

8. Apparatus according to claim 1 wherein said fluid supply control valve is a normally open solenoid valve having a solenoid winding, and wherein said circuit includes said winding.

9. Apparatus according to claim 8 wherein said solenoid is of the alternating current operable type.

10. Apparatus according to claim 1 wherein said fluid supply control valve is a normally closed, mechancial valve having an arm extending therefrom, said arm being movable to and from a first position in which said control valve is held closed thereby and a second position in which said control valve is held open thereby, and characterized by the addition of means for latching said arm in said second position to normally hold said control valve open, said circuit also including a solenoid having a winding and a core movable therein, said core being coupled to said latching means and being movable upon energization of said winding to withdraw said latching means from said arm to permit said arm to move to its said first position and thereby cause said control valve to close.

11. Apparatus according to claim 10 wherein said solenoid is of the direct current operable type.

12. Apparatus according to claim 11 wherein said solenoid winding is connected to said first mentioned switch, and characterized by the addition of a normally open second switch in series with said first mentioned switch, said second switch being disposed to be engaged by said arm and closed thereby when said arm is in said second position and to be opened when said arm is moved to its first position whereby to control the supply of electrical energy from said source through said first mentioned switch to said solenoid winding.

13. Apparatus according to claim 10 wherein said circuit includes
   (1) manually settable switch means operable at will to either
      (a) arm said monitoring apparatus to render it operative to cause said latching means to release said arm upon energization of said solenoid winding in response to detection of a leak in said system, or
      (b) disarm said monitoring apparatus to render it unresponsive to detection of a leak, and
   (2) means for indicating that a leak has been detected and said fluid control valve has been closed once said circuit has been armed by said manually settable switch means.

(References on following page)

References Cited

UNITED STATES PATENTS

| | | | |
|---|---|---|---|
| 970,122 | 9/1910 | Schmidt | 137—456 XR |
| 1,294,061 | 2/1919 | Dexter | 137—624.14 XR |
| 1,727,591 | 9/1929 | Fridstein | 137—503 XR |
| 2,081,542 | 5/1937 | Kidney | 137—456 XR |
| 2,691,705 | 10/1954 | Ray | 137—456 XR |
| 3,023,591 | 3/1962 | Tilney | 137—504 XR |

HAROLD W. WEAKLEY, *Primary Examiner.*

U.S. Cl. X.R.

137—503, 557, 487.5